United States Patent [19]

Sugano et al.

[11] Patent Number: 4,797,754
[45] Date of Patent: Jan. 10, 1989

[54] METHOD FOR WRITING SERVO PATTERN IN MAGNETIC DISK UNIT

[75] Inventors: Mitugu Sugano, Odawara; Shinichi Kaneko, Hadano; Mitsunori Oka, Fujisawa; Kimiya Nokina, Naka; Kazuhiro Koshimizu, Hiratsuka, all of Japan

[73] Assignees: Hitachi, Ltd.; Hitachi Electronics Eng. Co., Ltd., both of Tokyo, Japan

[21] Appl. No.: 941,645

[22] Filed: Dec. 15, 1986

[30] Foreign Application Priority Data

Dec. 13, 1985 [JP] Japan .................................. 60-279179

[51] Int. Cl.[4] .......................... G11B 5/09; G11B 15/12
[52] U.S. Cl. ............................................ 360/48; 360/62
[58] Field of Search ....................... 360/53, 48, 49, 50, 360/61, 62

[56] References Cited

U.S. PATENT DOCUMENTS 4,210,941 7/1980 Kashio .................................. 360/48

Primary Examiner—Vincent P. Canney
Attorney, Agent, or Firm—Antonelli, Terry & Wands

[57] ABSTRACT

With the inventive method, after a servo pattern data including index pattern is written onto the servo disk in a magnetic disk unit, a variety of software processes is effected thereafter, and the servo pattern data having been written is read and the index pattern is detected, a varify data is outputted, the comparison between the read index pattern data and the verify data is started, thereby verifying the validity of the writte servo pattern data. More particularly, immediately after completion of said variety of software processes and without waiting for the revolution of the servo disk, the verify data is compared with the read servo pattern data, whereby the write of servo pattern data onto the magnetic disk and the read verify process can be effected speedily.

5 Claims, 2 Drawing Sheets

METHOD FOR WRITING SERVO PATTERN IN MAGNETIC DISK UNIT

BACKGROUND OF THE INVENTION (a) Field of the Invention:

The present invention generally relates to a method for writing a predetermined servo pattern onto a servo disk in a magnetic disk unit, and more specifically to a method for writing a servo pattern and which is preferably usable in readily executing the read verify process to judge, after writing a servo pattern onto a servo disk, whether the servo pattern having been written is normal or not.

(b) Related Art Statement:

The process of writing predetermined servo pattern data onto a servo disk in a magnetic disk unit is effected in the process of manufacturing magnetic disk units. In this process, a read verify process is carried out to judge whether the servo pattern data has been normally written or not. The read verify process refers to a process in which, after servo pattern data is written onto the servo disk, the servo pattern data having been written is read and compared with the servo pattern that has been written. If the comparison result shows that a coincidence is found between the servo pattern data having been read and written, it is judged that the servo pattern data has been normally written. If no coincidence is found, it is determined tht the writing of the servo pattern data has failed.

Next, the prior-art method for writing servo pattern data will be explained below. FIG. 1 is an explanatory illustration of the prior-art servo pattern writing method. As shown, the servo pattern data SD is written onto the servo disk for a period of time from t1 to t2. This is followed by the software process including, for example, a preparation for the write check of servo pattern data SD, read verify process, etc. which is carried out for a period of time from t2 to t3. Then, for a period of time from t3 to t4, the servo disk rotates until the index pattern ID at the top of the servo pattern data SD comes to the installed position of the servo head. At the time t4, when the index pattern ID of the servo pattern data SD comes to the installed position of the servo head, the servo pattern data SD is read with the servo head and a read verify process is effected for a period of time from t4 to t5.

In the conventional method for writing of servo pattern data, however, a time (from t3 to t4) for waiting for the revolution of the servo disk is necessary, which causes an excess time for the write and read verify process to be completed. More particularly, although the read verify process is repeatedly carried out for a number of tracks on the servo disk, and the time for waiting for the revolution of servo disk per track is indeed short, a very long time is required for the writing entire servo disk.

It should be noted that the techniques related to the read verify process are disclosed in the Japanese Unexamined Patent Publication (Kokai) No. 59-210359 and U.S. Pat. No. 3,860,958.

SUMMARY OF THE INVENTION

The present invention seeks to provide an improved and novel method for writing servo pattern data on a magnetic disk unit, by which servo pattern data can be written onto a servo disk and a software process carried out, immediately followed by a read verify process without waiting for revolution of the servo disk between these operations. Since the read verify process is carried out immediately after the software process, it is possible to reduce the time for the servo pattern write process and read verify process. More particularly, since no waiting time for revolution of the disk between writing and read verify operations is required for the many tracks on the servo disk, much time can be saved in total, thereby providing for a considerably high speed of operation in effecting the servo pattern write process and read verify process.

Another object of the present invention is to provide a method for writing servo pattern data on a magnetic disk unit by, since the index pattern is read immediately after a variety of software processes are carried out, the index pattern is stored at an address on the magnetic disk which is offset from the top address of the servo pattern data by a predetermined number of addresses corresponding to an angle through which the servo disk revolves within a time taken for the above-mentioned software processes.

Still another object of the present invention is to provide a method for writing servo pattern data on a magnetic disk unit, by which by changing the sequence of reading the data from the memory in which the servo pattern is stored, the index pattern is written at an address offset a predetermined number of addresses on the magnetic disk.

Yet another object of the present invention is to provide a method for writing servo pattern data on a magnetic disk unit, by which the verify data is sequentially read from an address, derived from the addition of a number of addresses offset from said predetermined number of addresses and a number of addresses composing the index data, in a memory in which the servo pattern data (substantially equal to the verify data is stored).

These and other objects and advantages of the present invention will be better understood from the ensuing description made by way of example of the preferred embodiments with reference to the drawings.

DETAILED DESCRIPTION OF THE PREFERRED EMBODIMENTS

Figure 1:
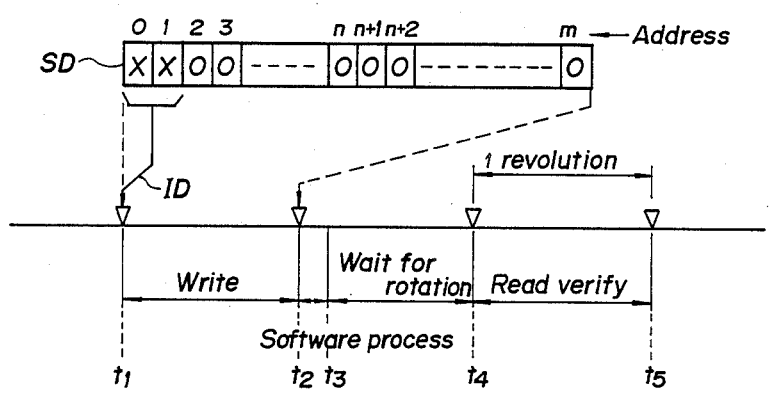
FIG. 1 shows the time chart of the prior-art servo pattern write and read verify process.
Figure 3:
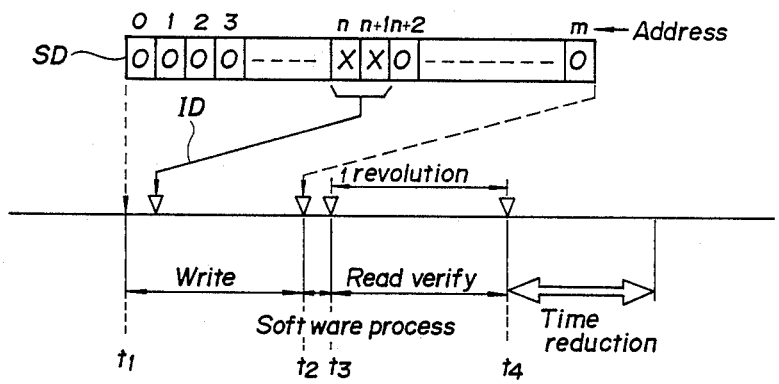
FIG. 3 is a time chart of the servo pattern write and read verify process which are effected in the embodiment shown in FIG. 2.
Figure 2:
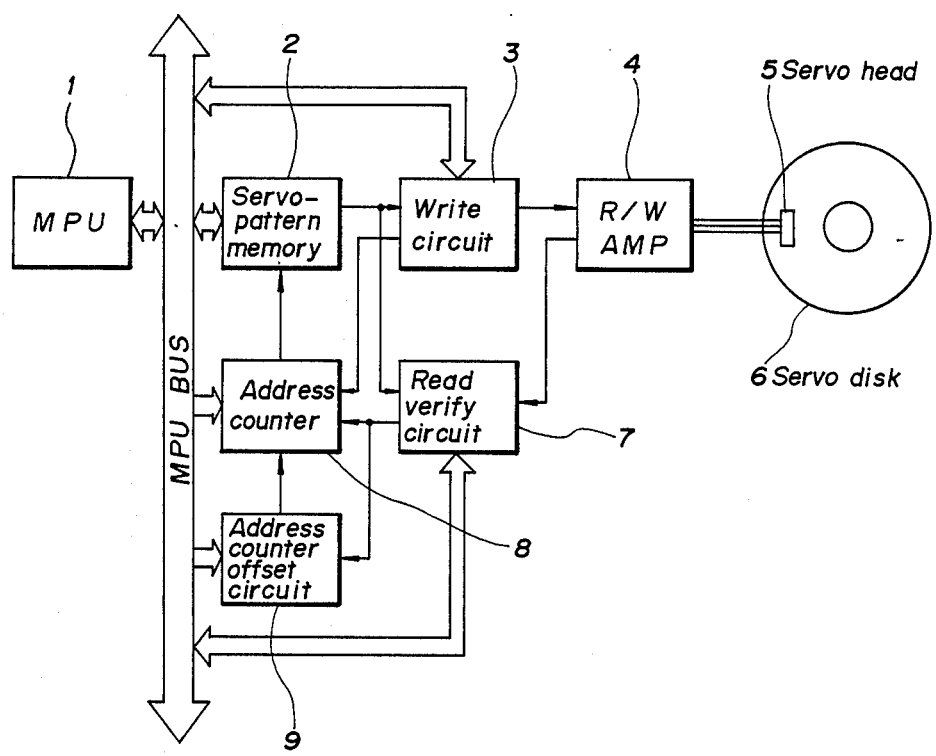
FIG. 2 is a block diagram showing one embodiment of the servo pattern write circuit which executes the inventive method for writing servo pattern data onto a magnetic disk unit.

FIG. 2 is a block diagram showing one embodiment of the servo pattern write circuit which executes the inventive method for writing servo pattern data. In FIG. 2, the servo pattern memory 2 has stored therein a predetermined servo pattern data. The process of writing the servo pattern data onto the serve disk 6 is carried out as follows. The servo pattern data is sequentially read from the servo pattern memory 2 by the address counter 8, and the servo pattern data thus read is written onto the servo disk through the write circuit 3 and read/write amplifier 4. The above-mentioned writing of servo pattern data is effected for a period of time from t1 to t2 as shown in FIG. 3. Note that the servo pattern data SD to be written onto the servo disk 6 does not have the index pattern ID at the top thereof, as shown in FIG. 1, but provides the index pattern ID at the addresses n and n+1. Also in case the servo pattern memory 2 has the index pattern ID stored at the top address therein, it is possible to write the servo pattern data SD onto the magnetic disk under control of the address counter offset circuit 9 and address counter 8 by the MPU 1 as shown in FIG. 3.

Next, a variety of software processes (including, for example, switching between write and read, preparation for the read verify process, etc.) is effected by MPU 1 for a period of time from t2 to t3 as shown in FIG. 3.

When the above-mentioned software processes are completed at the time t3, the index pattern ID of the servo pattern data comes to the position where the servo head 5 is installed because of the revolution of the servo disk 6 for the period of time from t2 to t3. Therefore, the index pattern ID may be read immediately from the servo head 5, and the read verify process is effected for a period of time from t3 to t4.

The above-mentioned read verify process is carried out as described in the following:

Namely, in FIG. 2, the servo pattern data SD written on the servo disk is read by the servo head 5, amplified by the read/write amplifier 4 and supplied as an input to the read verify circuit 7. In this condition, when the read verify circuit 7 detects the index pattern ID, the read verify process is started at this time of detection. The read data outputted from the read/write amplifier 4 is compared with verify data (identical to the servo pattern data) read from the servo pattern memory 2. At this time, the servo pattern memory 2 reads the stored verify data from the (n+2)th address because of the following. As shown in FIG. 3, index pattern ID is written at the nth and (n+1)th addresses of the servo pattern data SD written in the servo disk 6, and the read verify process is started synchronously with that index pattern ID. Therefore, it is necessary to make the read sequence of verify data coincide with that of servo pattern data. To read the verify data in said servo pattern memory 2 from the (n+2)th address, an offset value (n+2) is outputted from the address counter offset circuit 9 during the read verify process.

The read verify circuit 7 compares the verify data with the servo pattern data and reports to MPU 1 whether there is any error or not.

As apparent from the foregoing, according to this embodiment, the time following the writing of the servo pattern data SD until the time the index pattern ID on the servo disk 6 comes to the servo head 6 can be made to coincide with the length of the time period of the software process, whereby it is possible to eliminate the waiting time for revolution of the servo disk 6 before the read verify operation can be started. So, it is possible to enable a high speed writing of servo pattern data SD and the read verify process.

More particularly, though only a short time for waiting for the revolution of the servo disk per track can be saved, much time can be saved for the entire servo disk, since it has many tracks.

What is claimed is:

1. A method of writing servo pattern data on a rotating magnetic disk having a plurality of recording tracks, comprising the steps of:
   (a) writing servo pattern data including an index pattern onto a selected recording track of said rotating magnetic disk;
   (b) effecting a plurality of processes during a predetermined period of time of known length immediately following said writing of servo pattern data;
   (c) reading the servo pattern data which has been written on said selected recording track, including reading the index pattern included in said servo pattern data immediately following completion of said plurality of processes; and
   (d) comparing the servo pattern data read from said selected recording track with the servo pattern data written on said selected recording track to determine whether a coincidence exists therebetween;
   wherein said index pattern is positioned within said servo pattern data at a location which is spaced from the beginning of the servo pattern data by a distance which results in said index pattern being read out in step (c) without delay following completion of said plurality of processes.

2. A method according to claim 1, wherein said step (a) includes:
   (a1) storing data signals forming said servo pattern data including said index pattern in respective sequential storage locations of a memory, so that a data signal representing said index pattern is stored in a storage location which is offset from the first storage location of said sequence storage locations by a predetermined number of storage locations corresponding to the angle through which the servo disk rotates during said predetermined period of time of known length; and
   (a2) reading said data signals out of said memory in the order of said sequence of storage locations beginning with said first storage location for writing said data signals on said selected track of said rotating magnetic disk.

3. A method according to claim 2, wherein said step (d) includes:
   (d1) reading said data signals from said sequential storage locations of said memory beginning with the storage location of the data signal immediately following the storage location of the data signal representing said index pattern and continuing from the last storage location to the first storage location of said sequence of storage locations, so that all data signals are read out; and
   (d2) comparing the respective data signals read out in step (c) to the respective data signals read out in sub-step (d1) to detect coincidence therebetween.

4. A method according to claim 2, wherein said step (a) includes:
   (a1) storing data signals forming said servo pattern data including said index pattern in respective storage locations of a memory;
   (a2) reading said data signals out of said memory in a sequence in which a data signal representing said index pattern is located at a position offset from the first data signal of said sequence; and
   (a3) writing said data signals in the order of said sequence of reading in sub-step (a2) onto said selected recording track.

5. A method according to claim 4, wherein said step (d) includes:
   (d1) reading said data signals from said memory in a sequence different from the sequence of sub-step (a2); and
   (d2) comparing the respective data signals read out in step (c) to the respective data signals read out in sub-step (d1) to detect coincidence therebetween.

* * * * *